Oct. 12, 1954
H. R. YOUNG
2,691,694
POLYTETRAFLUOROETHYLENE-GLASS FIBER
INSULATED ELECTRICAL CONDUCTORS
Filed April 9, 1949
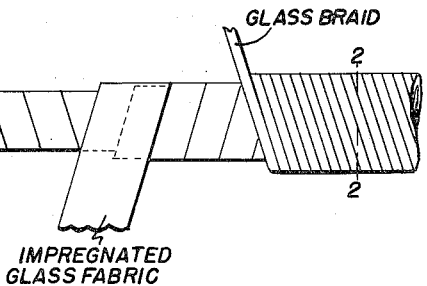
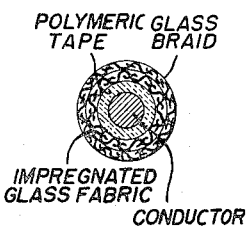
*INVENTOR.*
HARRY ROSS YOUNG
BY a. Newton Neff
*ATTORNEY*

Patented Oct. 12, 1954

2,691,694

UNITED STATES PATENT OFFICE 2,691,694

POLYTETRAFLUOROETHYLENE - GLASS FIBER INSULATED ELECTRICAL CONDUCTORS

Harry Ross Young, Havertown, Pa., assignor to E. I. du Pont de Nemours and Company, Wilmington, Del., a corporation of Delaware Application April 9, 1949, Serial No. 86,448

10 Claims. (Cl. 174—121)

This invention relates to new and improved insulated electrical conductors, and, more particularly, to electrical conductors with an insulation of polymeric material, said insulation having improved dielectric and physical properties.

By the term "polymeric material," as used hereinafter, is meant polytetrafluoroethylene or copolymers of tetrafluoroethylene with one or more polymerizable organic compounds containing an ethylenic double bond, such as ethylene, vinyl chloride, vinylidene chloride, and alkyl esters of acrylic and methacrylic acids. By the term "polymeric tape," as used hereinafter, is meant tape made from such polymeric material.

It has been proposed to cover conductors with sheets of polymeric material of the type defined above applied according to the teaching of United States Patent 2,392,388, but this method is relatively cumbersome and expensive.

It has also been proposed to cover wire with such polymeric tape prepared according to the teaching of United States Patent 2,406,127, but such conductors are deficient in physical and dielectric properties, because of the non-continuity of the insulation and the minute air gaps and thickness irregularities resulting when the polymeric tape is wrapped around the conductor. Furthermore, even when such conductors are provided with auxiliary coverings (such as tape which hardens in the presence of heat alone and/or glass serving or glass braid, and/or silicone or other resins), they are subject to the disadvantage that when the auxiliary coverings are loosened or stripped away, as in preparing the conductor for splicing, the polymeric tape usually unravels; or when a resin is used to fill in between the tape windings, high temperatures cause it to decompose, leaving the same undesirable air gaps.

The nature of the polymeric material sheeting or tape defined above is such that it does not fuse, adhere, or unite to itself except under the influence of relatively high temperature and pressure simultaneously applied. Copending application Serial No. 51,567, filed September 28, 1948, by Philip F. Sanders, now Patent No. 2,606,134, describes a convenient method of applying heat and pressure simultaneously to a continuous polymeric tape-wrapped wire, in which a wire is wrapped with polymeric tape, a "serving" of glass yarn or braid is applied around the wrapping of polymeric tape, and then heat is applied to the assembly. The heat expands the polymeric material to a greater degree than it expands the glass yarn and wire conductor (the linear coefficients of thermal expansion per ° F. (77–140° F.) of polyetrafluoroethylene, for instance, being about $50 \times 10^{-6}$, of glass, about $8 \times 10^{-6}$, and of copper, $16 \times 10^{-6}$, and thus creates pressure and results in fusion of the polymeric material and adherence to the wire and glass yarn.

It has now been found that the product produced by this aforementioned method can be improved in dielectric breakdown strength and also in abrasion resistance, while retaining its other desirable properties.

It is therefore a primary object of this invention to provide an improved insulated electrical conductor having vastly superior dielectric breakdown strength and abrasion resistance in comparison with prior insulation systems. It is another object to provide an improved insulated electrical conductor having no voids or air spaces in the insulating walls. It is an additional object to provide an improved insulated electrical conductor whose insulation will not unravel. A further object is to provide a process of insulating electrical conductors with polymeric tape fused to form a continuous integral coating around the conductor. It is a still further object to provide a process of making polymeric material-insulated electrical conductors, possessing improved physical and electrical properties, with conventional wire wrapping equipment. Other objects will be apparent from the following description of the invention.

These objects are accomplished by wrapping an electrical conductor with the polymeric tape defined above, applying a wrapping of glass fabric impregnated with this polymeric material around the wrapping of polymeric tape, applying a "serving" of glass yarn or a covering of glass braid around the wrapping of impregnated glass fabric, and heating the so-wrapped conductor to at least the fusion temperature of the polymeric material.

Conventional wire wrapping machines may be used to perform the three wrappings.

If desired, one or more applications of a coating composition comprising a suspensoid of the polymeric material may be made over the outer wrapping of glass braid prior to the final heating step. Suitable polymeric material suspensoids are of the type disclosed in Example 2 below or copending applications Serial Nos. 607,255 and 607,256, filed July 26, 1945, by Kenneth L. Berry, now Patents 2,484,483 and 2,448,952, respectively. Serial No. 713,385, filed November 30, 1946, by Malcolm M. Renfrew, now Patent 2,534,058, and Serial No. 750,166, filed May 23, 1947, by C. K. Ikeda, now Patent No. 2,592,147.

The product of this invention, with or without the suspensoid application, is an electrical conductor covered with an insulating system which is heat resistant, relatively thin, mechanically strong, water- and char-resistant, chemically inert, insoluble, flexible, adherent to the conductor, and unexpectedly very high in electrical and abrasion resistance. The insulation also possesses a high degree of "cut-through" resistance. This latter property prevents wires pressed tightly against each other from cutting through the insulation and causing short circuits. The insulation will not unravel, and it permits a clean "strip" when the covering is peeled to make a connection.

Referring to the drawings,

Fig. 1 is a side elevation showing an electrical conductor having single wrappings of a polymeric tape, an impregnated glass fabric, and glass braid, prior to fusion of the polymeric tape;

Fig. 2 is a transverse section on the line 2—2 of Fig. 1;

Fig. 3 is a transverse section showing the electrical conductor of Fig. 2 with an outer coating of a polymeric material suspensoid coating composition;

Fig. 4 is a transverse section corresponding to Fig. 2, showing a further modification of the invention in which the wrapping of polymeric tape is omitted;

Fig. 5 is a side elevation showing another modification of the invention in which a multi-strand cable is wrapped with two oppositely wound strands of polymeric tape, two opposite windings of impregnated glass fabric, a "serving" of glass braid, and finally a coating of polymeric material suspensoid, prior to fusion of the polymeric tape; and Fig. 6 is a transverse section on the line 6—6 of Fig. 5, showing penetration of the polymeric material into the interstices of the cable after fusion of the polymeric tape.

The following examples illustrate embodiments of this invention and are given by way of illustration only.

*Example 1*

The 16 gauge conductor to be insulated consisted of 19 individual silver-plated copper wires, each about 29 gauge (American wire gauge), and twisted slightly to form a compact bundle. Using a conventional wire wrapping machine, this conductor was given two reversely wound wrappings of a polytetrafluoroethylene tape 3 mils in thickness and ½ inch wide. With an "overlap" of 50%, each wrapping covered the core with two layers (6 mils) of polymeric tape, producing a 12 mils total thickness of tape.

Owens-Corning Fiberglas Corporation's ECC-11-106 glass fabric, having the following specifications:

| | |
|---|---|
| Thickness | 1½ mils. |
| Yarn size | 900 1/0. |
| Individual filaments per yarn | 102. |
| Yarn diameter | .0014". |
| Thread count | 56 x 56. |
| Oz. per square yard | .7. | and impregnated with 3.1 ounces (solids) of polymeric material suspensoid per square yard, as disclosed in copending application Serial No. 86,606, filed April 9, 1949, by Philip F. Sanders, now Patent 2,539,329, was cut into ½ inch wide strips.

Using the same machine and performing the operation at a point just after the polymeric tape wrapping step, the core was given two reversely wound wrappings of the impregnated glass fabric tape having an overlap of 50%. The total thickness of the wrappings of impregnated glass fabric was 10.4 mils, and this made a total thickness of polymeric tape and impregnated glass fabric of 22.4 mils.

Using a braiding machine and performing the operation at a point just after the glass fabric tape-wrapping step, the core was covered in a conventional manner with a continuous braiding of Owens-Corning Fiberglas Corporation's ECD-450-½-3 glass fiber.

The wrapped and braided wire was passed once, as a continuous single strand, at a rate of 17 feet per minute, through a 20 feet-long oven heated to 900° F., and then wound on a take-up spool. This fused the insulation into a continuous covering which had high dielectric breakdown strength and abrasion resistance, and, although adherent to the conductor, the insulation could be easily stripped to make electrical connections. It did not slide along the conductor and would not fray or unravel.

*Example 2*

The product of this example was prepared in the same manner as that described in Example 1, except that, after the glass braid was wound around the ouside of the wrapped conductor, six coats of an aqueous suspensoid of polytetrafluoroethylene having the following composition:

| | Parts by weight |
|---|---|
| Finely divided polytetrafluoroethylene | 20.0 |
| Sodium salt of a sulphuric acid ester of a mixture of long chain alcohols (predominantly lauryl alcohol) | 0.8 |
| Water | 79.2 | were applied over the glass braid and then the whole assembly was heated as described in Example 1.

Scrape abrasion and dielectric breakdown strength comparisons were made with the following results:

| | Scrape Abrasion (cycles) | Dielectric Breakdown Strength (total volts) |
|---|---|---|
| Wire A | 1,668 | 14,500 |
| Wire B | 41 | 9,000 |

Wire A was the product of Example 2 above.

Wire B was a cable which had been wrapped with 4 wrappings of polytetrafluoroethylene tape (3 mils in thickness and ½ inch wide), the wrappings alternating clockwise and counterclockwise. With an "overlap" of 50%, each wrapping covered the core with 2 layers (6 mils) of polymeric tape, producing a 24 mil total thickness of tape. The wrapped core had been covered with a continuous woven braid of glass yarn, then coated with six coats of the aqueous suspensoid described above, and finally heated to fuse the polymeric material.

It will thus be seen that, while wires A and B had comparable thicknesses of insulation, wire B did not have the impregnated glass fabric wrapping interposed between the polymeric tape and the glass braid.

The scrape abrasion test was carried out with an apparatus (commonly known as a "squirrel cage") that repeatedly scraped the surface of the insulated conductor with a series of rectangular metallic bars having very sharp edges and mounted on a cylindrical frame. The insulated wire was held against these bars under a one-pound weight. The bars and the conductor were attached to opposite poles of a source of electricity. The scrape abrasion resistance was rated by the number of cycles (one forward plus one backward scrape through an arc of 180°) required to wear through the insulation and cause electrical contact.

The dielectric breakdown strength was run using apparatus specified in A. S. T. M. D–149–44. An insulated section of the sample was immersed in an aqueous solution of sodium chloride (5%) and wetting agent (1%). The wetting agent was a sodium salt of a sulphuric acid ester of long chain alcohols (predominantly lauryl alcohol). By using this immersed insulated conductor as one electrode, introducing another electrode into the solution, and applying an increasing electrical potential until an arc occurred, the dielectric breakdown point was determined.

The invention has been described with reference to the insulating of copper wire. It is to be understood that other electrical conductors and semi-conductors may be insulated in accordance with this invention. The size of the wire conductor may vary over a wide range, from the finest wire capable of being wrapped with polymeric tape and impregnated glass fabric to multistrand cables, rods, and bars of all commercial sizes.

When a copolymer of the type defined above is used in the practice of this invention, it is preferred to use a copolymer of tetrafluoroethylene and ethylene, and particularly one which contains from 60% to 85% tetrafluoroethylene and 40% to 15% ethylene.

The bake-oven temperature to bring about the fusion or union of the polymeric tape into a continuous integral coating will vary with the linear speed of the conductor being insulated, length of oven, size and type of conductor, and particular polymeric material used. The absolute minimum temperature to cause fusion of polytetrafluoroethylene is 621° F., but that to fuse the copolymer is dependent upon the proportion and fusion point of the modifying material or materials present, and will be somewhat less than 621° F. The maximum temperature that may be used for either type of polymeric material is that at which undesirable decomposition occurs (approximately 930° F., depending upon the above-mentioned variables). The minimum temperature required to create sufficient pressure to fuse or unite the polymeric tape into a continuous covering is at least the fusion point of the polymeric material, depending mainly upon how tightly the glass serving or braid is wound, the thickness of the tape, and the composition of the polymer. A loosely wound glass cover allows greater average free space for expansion of the polymer before pressure is created. Conversely, tightly wound glass allows substantially no free space, and pressure develops following a slight temperature increase. Therefore, extremely tight glass wrapping should be avoided so that excessive pressure is not developed below the fusion point, to prevent setting up undesirable stresses in the insulation. It has been found that specific precautions to avoid too loose or too tight a glass covering are not usually required in the actual machine production of glass wound wire because the tightness of the glass covering normally acceptable for other processes is within the operable limits of this invention.

While conventional wire-enameling ovens are most convenient for the baking operation of this invention, it is obvious that various means of supplying heat and controlling temperature are operable.

Many combinations of insulation are intended in this invention—for instance, one or more layers of polymeric tape and/or one or more layers of impregnated glass fabric; the layers may be wrapped in the same or opposite directions; the tape and impregnated glass fabric may be of any convenient width and may be wound at any convenient angle or in any desired way to produce any degree of overlap, which in turn governs the number of thicknesses of wrapping material applied per winding operation; and the impregnated glass fabric tape may be of any convenient size and weave.

It is also possible to apply a polytetrafluoroethylene impregnated glass fabric tape in which the polytetrafluoroethylene particles have not been fused, and subsequently fuse the impregnant particles.

When a liquid polymeric material coating composition is applied over the glass braid, the solids content thereof may be varied over a wide range to decrease or increase the film build per coat, although the preferred range is 20% to 70% solids.

The insulated wire of this invention has many unexpected advantages over similarly wrapped conductors. It possesses vastly improved dielectric properties (probably resulting from the absence of air gaps and void spaces), the insulation does not unravel or separate between layers, and it also possesses greatly improved resistance to abrasion. The components of the insulation are firmly bonded throughout and to the metal core. The insulation will not slide along the conductor and bunch in concentrated areas, nevertheless, when the insulation is stripped off to make an electrical connection, a clean exposed metal surface will be presented. Another advantage is that there are no foreign materials present which possess less desirable characteristics, which is often the case in similar conductors insulated by wrapping. In comparison with previous wrapped wires, the insulated conductors of this invention may be handled more roughly, wound faster, and with fewer precautions in production winding operations, without danger of breaking or damaging the insulation and thereby causing failure of electrical equipment in which it is used. In the case of twisted cables containing several indiviual wires, or twisted cables containing several multi-wire elements, the polymeric material forces itself into the interstices of the cable; thus air is replaced with high dielectric material and simultaneously the cable is "cast" or embedded in its insulation, which action is not obtainable in a conventional wrap-insulation procedure.

The insulated wire of this invention is adapted for a wide range of uses, such as high temperature-resistant magnet coils, motors, generators, transformers, resistors, cables, heating coils, switch gear, and electric control equipment. Wires insulated with glass fabric and polymeric material in accordance with this invention are particularly useful where long life and resistance to high heat, oxidation, corrosive conditions, solvents, gasoline, and lubricants are important.

It is apparent that many widely different embodiments of this invention can be made without departing from the spirit and scope thereof; and, therefore, it is not intended to be limited except as indicated in the appended claims.

I claim:

1. An electrical conductor provided with an insulating covering comprising a pre-impregnated woven glass fabric and a superposed glass braid, the impregnant of the woven glass fabric being a polymeric material selected from the group consisting of polytetrofluoroethylene and copolymers of tetrafluoroethylene with another polymerizable organic compound containing an ethylenic double bond, said polymeric material being fused into a continuous mass which firmly bonds the impregnated woven glass fabric and the superposed glass braid to each other and adheres the bonded mass to the conductor.

2. The electrical conductor of claim 1 in which the polymeric material is polytetrafluoroethylene.

3. The electrical conductor of claim 1 in which the polymeric material is a copolymer of tetrafluoroethylene and another polymerizable organic compound containing an ethylenic double bond.

4. The electrical conductor of claim 1 in which the polymeric material is a copolymer of 60–85% of tetrafluoroethylene and 40–15% of ethylene.

5. An electrical conductor provided with an insulating covering comprising a wrapping of a polymeric material tape, a wrapping of a pre-impregnated woven glass fabric, and a superposed wrapping of glass braid, the polymeric material tape and woven glass fabric impregnant being a polymeric material selected from the group consisting of polytetrofluoroethylene and copolymers of tetrafluoroethylene with another polymerizable organic compound containing an ethylenic double bond, said polymeric material being fused into a continuous mass which firmly bonds the tape, the impregnated woven glass fabric, and the superposed glass braid to each other and adheres the bonded mass to the conductor.

6. The electrical conductor of claim 5 in which the polymeric material is polytetrafluoroethylene.

7. The electrical conductor of claim 5 in which the polymeric material is a copolymer of tetrafluoroethylene and another polymerizable organic compound containing an ethylenic double bond.

8. An electrical conductor provided with an insulating covering comprising a wrapping of a polymeric material tape, a wrapping of a pre-impregnated woven glass fabric, a superposed wrapping of glass braid, and a coating over the glass braid of a polymeric material suspensoid, the tape, woven glass fabric impregnant, and suspensoid being a polymeric material selected from the group consisting of polytetrafluoroethylene and copolymers of tetrafluoroethylene with another polymerizable organic compound containing an ethylenic double bond, said polymeric material being fused into a continuous mass which firmly bonds the tape, the impregnated woven glass fabric, and the superposed glass braid to each other and adheres the bonded mass to the conductor.

9. The electrical conductor of claim 8 in which the polymeric material is polytetrofluoroethylene.

10. The electrical conductor of claim 8 in which the polymeric material is a copolymer of tetrafluoroethylene and another polymerizable compound containing an ethylenic double bond.

References Cited in the file of this patent

UNITED STATES PATENTS

| Number | Name | Date |
| --- | --- | --- |
| 2,231,606 | Stewart | Feb. 11, 1941 |
| 2,234,560 | Keyes | Mar. 11, 1941 |
| 2,365,019 | Stewart | Dec. 12, 1944 |
| 2,370,046 | Keyes | Feb. 20, 1945 |
| 2,392,388 | Joyce | Jan. 8, 1946 |
| 2,397,568 | Seaman | Apr. 2, 1946 |
| 2,400,099 | Brubaker | May 14, 1946 |
| 2,412,960 | Berry | Dec. 24, 1946 |
| 2,427,183 | Berry | Sept. 9, 1947 |
| 2,454,625 | Bondon | Nov. 23, 1948 |
| 2,459,633 | Keyes | Jan. 18, 1949 |
| 2,464,062 | Strain | Mar. 8, 1949 |
| 2,484,484 | Berry | Oct. 11, 1949 |

FOREIGN PATENTS

| Number | Country | Date |
| --- | --- | --- |
| 564,245 | Great Britain | Sept. 19, 1944 |

OTHER REFERENCES

Ser. No. 275,250, Deppe (A. P. C.), published May 18, 1943.